W. A. BROWN.
MARKING MEANS FOR SENSITIZED MATERIAL.
APPLICATION FILED FEB. 1, 1915.

1,315,655.

Patented Sept. 9, 1919.
2 SHEETS—SHEET 1.

INVENTOR.
Watson A. Brown
BY H. H. Sims
ATTORNEY.

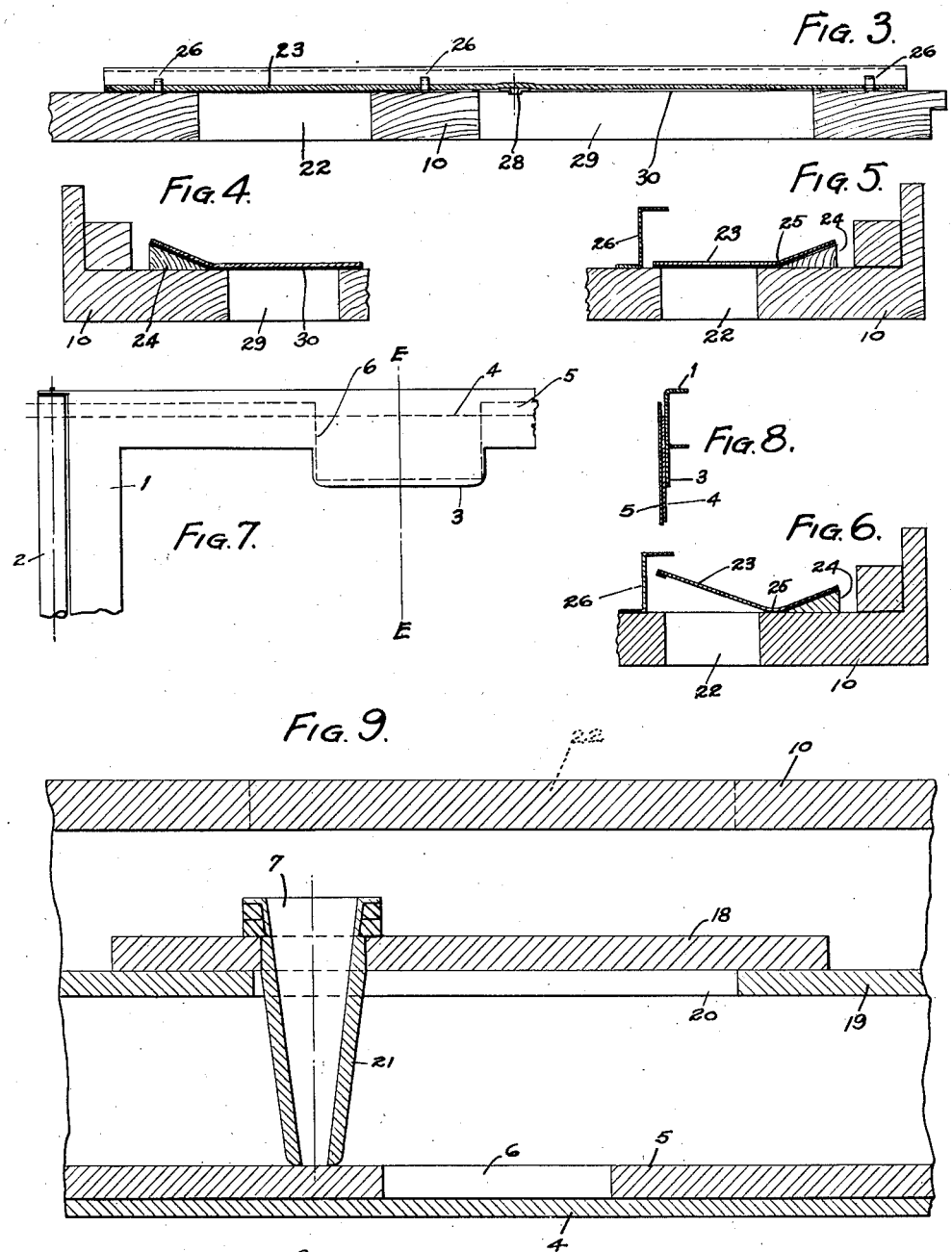

UNITED STATES PATENT OFFICE.

WATSON A. BROWN, OF ROCHESTER, NEW YORK.

MARKING MEANS FOR SENSITIZED MATERIAL.

1,315,655. Specification of Letters Patent. Patented Sept. 9, 1919.

Application filed February 1, 1915. Serial No. 5,539.

*To all whom it may concern:*

Be it known that I, WATSON A. BROWN, of Rochester, county of Monroe, State of New York, have invented a new and useful Marking Means for Sensitized Material, of which the following is a specification.

The present invention relates to marking means for sensitized material, the present embodiment being designed for marking photographic films or plates in the camera for the purpose of identifying the same or for any other reason that may be considered desirable.

An object of this invention is to provide a construction in which the marking is made upon a suitable surface on the camera and is reproduced on the sensitized material in a different size, preferably a smaller size so that the marking will be inconspicuous on the finished photograph. Another object of the invention is to provide a construction in which a small beam of rays and a sheet of sensitized material are caused to move relatively so that any configuration or mark may be exposed upon the sensitized material. A still further feature of the invention is the employment of a pantograph, the movement of which produces on the sensitized material any desired marks.

To these and other ends the invention consists in certain parts and combination of parts, all of which will be described hereinafter and will be more particularly pointed out in the appended claims.

In the drawings;

Fig. 3 is a section on the line A—A Fig. 1;

Fig. 4 is a section on the line B—B Fig. 1;

Fig. 5 is a section on the line C—C Fig. 1;

Fig. 6 is a view similar to Fig. 5 showing the shutter of the opening in the camera casing in an open position;

Fig. 7 is a detailed view of an ordinary film guide which is modified by the provision of an extension to produce an unexposed portion on the film in proximity to one edge of such film;

Fig. 8 is a section on the line E—E Fig 7; and

Fig. 9 is an enlarged sectional view;

Figure 1:
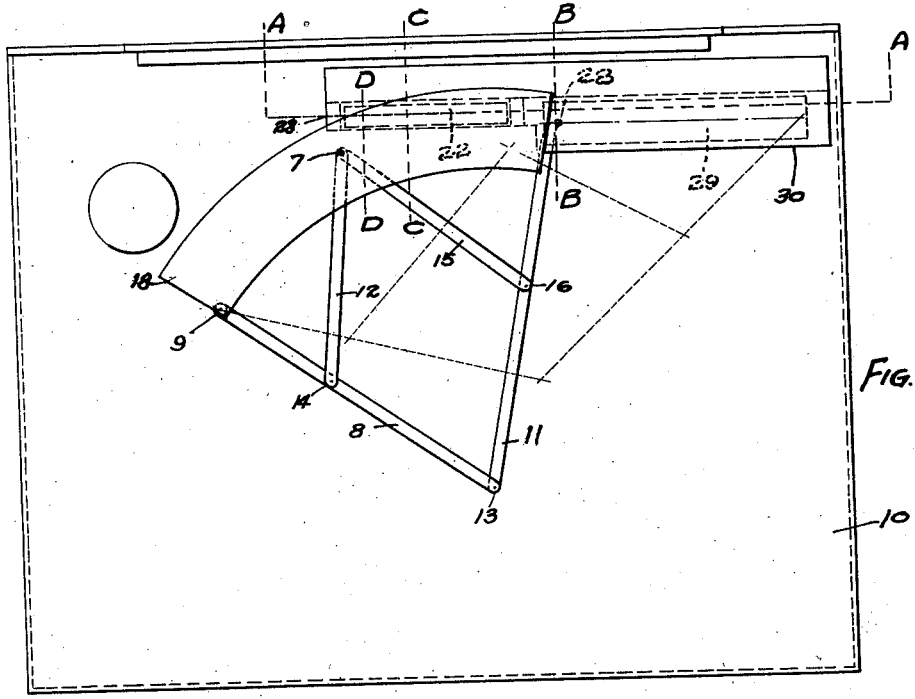
Figure 1 is a view of the inner face of the camera back to which the present invention has been applied.
Figure 2:
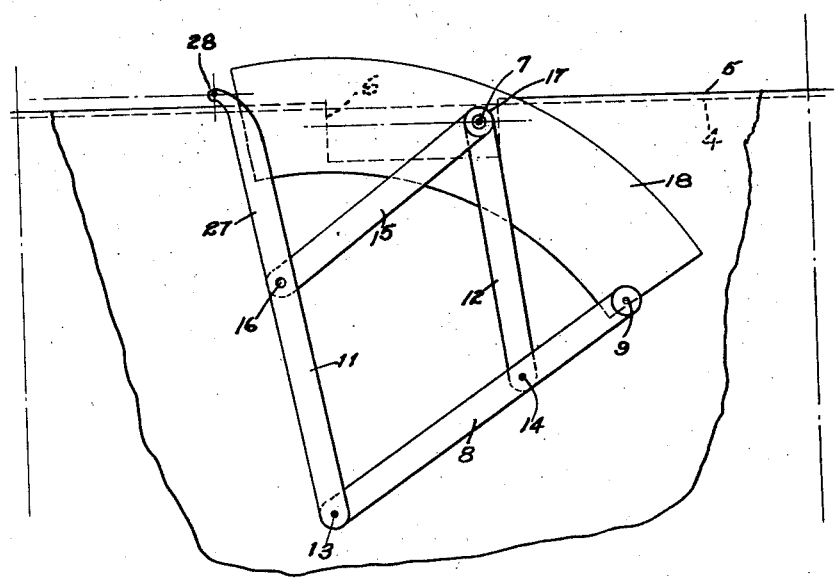
Fig. 2 is an enlarged view of the pantograph showing its operation over the sensitized material.

The invention as illustrated is embodied in a film camera of a well known type, but it is to be understood that the invention is not limited to the present illustration or embodiment. In a camera of the type shown, the film passes from one spool to another over a guide frame 1 of rectangular form having at opposite sides anti-friction rollers 2. This guide frame has been modified by the provision of a lateral extension shield or lip 3 which projects over the film 4 near one edge of the latter to prevent the exposure of a portion of the film for a purpose to be hereinafter described. The film is associated as usual with the backing sheet or protecting cover 5 which has been modified, in this instance, by the provision of a number of recesses 6 along one edge thereof, such recesses corresponding in number to the number of exposures to be made on the film or sheet of sensitized material.

Arranged to operate over the cutaway portions of the cover or backing sheet is an exposure opening 7, the latter, if desired, having therein a lens or a suitable means to concentrate a beam of rays upon any portion of the film 4 exposed by the recess 6 in the cover or backing 5. In the present instance, the exposure opening 7 is formed in a pantograph which, preferably embodies an arm 8 pivoted at 9 to the inner face of the removable camera back 10 and having parallel arms 11 and 12 pivoted thereto at 13 and 14, respectively, said arms 11 and 12 being connected by an arm 15 which is parallel with the arm 8, the arm 15 being pivoted at 16 to the arm 7 and at 17 to the arm 12, and the opening 7 being concentric with the pivot 17.

With the end in view of excluding light from the film or sensitized sheet 4 by way of the recess 6 except through the exposure opening 7, there is provided a light excluding element 18 which, preferably, is carried by the pantograph to move with the latter and which, in this instance, is in the form of a piece of sheet material coated black and secured about the opening 7. This light excluding plate bears against a wall 19 which is secured to the cover plate 10 and is provided with a slot or opening 20 directly over the recess 6 and the lip 3, said slot or opening being slightly longer than the recess 6 in order that the exposure opening 7 may be thrown to either end of the slot beyond the ends of the recess 6 and in this way to exclude still further the entrance of light to the film or sensitized material when the marking means is not being used. A projection 21 may be formed on the pantograph about the opening 7 to extend through the slot 20 in order to bring the end of the opening 7 in close proximity to the film, the extreme end of this projection 21 being rounded in order that it may ride freely over the film and its cover.

In order to admit light to the exposure opening 7, the casing-back or cover 10 is provided with an opening 22 which normally is closed by a shutter 23, the latter preferably being in the form of some stiff material, such as celluloid, which will bend easily but will spring back quickly to closed position. As illustrated, one edge of this material is secured to a wedged shape piece 24 so that the material is bent at 25, thus giving it a pressure about the opening 22. Stops 26 may limit the inward movement of the free edge of this shutter. The lip 3 is located opposite the shutter opening 22.

The arm 11 of the pantograph may have a tracing extension 27 formed with an opening 28 at one end through which a pencil may be passed and this opening operates under a slot 29 formed in the camera cover or back. This pencil opening may also operate over a surface 30 on which may be formed writing or other suitable marks, so that a user may introduce a pencil or other marking instrument into the opening 28 and write or form on the surface any desired matter, such for instance, as the date or title of the photograph. In this instance, this surface 30 is connected with the shutter 23, being in one piece with the latter and normally held in a closed position by the wedged shape portion 24. By this arrangement, when pressure is placed upon the surface 30, as in writing, the surface yields inwardly and produces an inward movement of the shutter 23, thus causing light to pass through the opening 22 and through the opening 7 to the film 4.

The operation of the invention will be understood from the foregoing description but it may be summarized as follows;

The films or sheets of sensitized material are brought, in the usual manner, to exposing position in relation to the camera shutter. When in this position, the opening of the shutter effects, as usual, the exposure of the film, with this difference, that a space at one end of the film is unexposed, due to the fact that the extension 3 covers it. After the exposure is taken and before the film is shifted, the user may introduce his pencil into the opening 28 and write on this surface 30 the title of the film, the date of the exposure or any other desired matter. With the movement of the pencil over the surface 30, the latter is moved and held inwardly, opening the shutter 23 and causing the pantograph to move with the pencil. This effects the movement of the opening 7 in correspondence with the pencil and directs a small beam of light on the film by way of the opening 22, exposure opening 7, and the recess 6 in the cover sheet of the film. The light excluding element 18 travels with the pantograph in close proximity to the opening 20 in the wall 19 and, in this way, prevents the entrance of light to the film except by way of the exposure opening 7. When the writing on the surface 30 is discontinued, the surface moves back to close the opening 29 and, at the same time, effects the closing of the opening 22 by the shutter 23, thus preventing the entrance of light to the film except during the writing. The end of the projection 21 is movable beyond the ends of the recess 6 so that the entrance of light to the film may be still further prevented.

From the foregoing it will be seen that 1 have provided a construction in which any desired matter may be delineated upon a sensitized sheet of material merely by effecting a relative movement between the sensitized material and a small beam of light. While this feature has been embodied in a camera, it is apparent that it is not limited to this arrangement but that it may be used in any connection where it may be desired. It will also be seen that the invention embodies the feature of reproducing in a different size and on a sheet of sensitized material within a camera, matter which has been formed upon a surface on the camera. It will also be noted that the invention embodies the feature of marking matter on a sensitized sheet of material by means of a pantograph. There are also embodied in the invention certain changes in the camera by reason of the attachment of the marking means thereto. These changes produce a film with an unexposed portion inclosing the exposed identifying portion produced by the marking means. With this arrangement the photograph made from the film has a white panel about the identifying matter and this identifying matter is smaller than ordinary writing, thus rendering it inconspicuous.

The lip 3 which produces this inscription panel also serves as a support for the autographed portion of the film, which holds it in close proximity to the inner end of the light pencil or tubular projection 21, guarding against diffusion of the light rays which would result in a more or less indistinct autograph upon the film.

Having thus described my invention, what I claim is:—

1. In combination with means for supporting a sheet of sensitized material, means provided with an exposure opening, and manually operable means for effecting a relative movement between such sensitized material and the exposure opening to cause the latter to reproduce on such material the relative movement.

2. In combination with a sheet of sensitized material, means provided with an exposure opening, means for supporting and manually operable means for moving said exposure opening over the material to reproduce the movement of such exposure opening on the sensitized material.

3. In combination with means for supporting a sheet of sensitized material, means provided with an exposure opening, a surface on which matter is to be written, and means operable over said surface and connected with the means provided with the exposure opening to cause the latter to travel over the sensitized material to reproduce matter written on such surface.

4. In combination with means for supporting a sheet of sensitized material, means provided with an exposure opening, a surface on which matter is to be written, and a pantograph operable over said surface and connected to the means provided with the exposure opening to cause the latter to expose the sensitized material in correspondence with the matter written on the surface.

5. In combination with means for supporting a sheet of sensitized material, means provided with an exposure opening, means for cutting off rays from such opening, a surface on which matter is to be written, connected to the last named means for permitting the passage of the rays when pressure is applied to such surface, and means operable over said surface and connected to the means provided with the exposure opening to cause the latter to travel over the sensitized material to reproduce matter written on such surface.

6. In combination with means for supporting a sheet of sensitized material, a movable surface on which matter is to be written, means provided with an exposure-opening, means controlled by said movable surface for cutting off light rays from such opening, and means movable over said surface and operably connected to the means having the exposure-opening.

7. In an autographic camera, the combination of means for supporting a sheet of sensitized material, a wall in the camera having an aperture, a light-tube movable in said aperture, a shutter for said aperture movable with said tube, an operating device outside the camera, and means connecting said tube with said operating device.

8. In combination with means for supporting a sheet of sensitized material, means provided with an exposure opening, a depressible part having a surface on which matter is to be written, means operable over said surface and connected to the means having the exposure opening, and a shutter for the exposure opening connected with said depressible part to open the shutter when the part is depressed.

9. In combination with means for supporting a sheet of sensitized material, means provided with an exposure opening, a depressible part having a surface on which matter is to be written, means operable over said surface and connected to the means having the exposure opening, and a shutter for the exposure opening formed integral with said depressible part.

10. In combination with means for supporting a sheet of sensitized material, means provided with an exposure opening, a depressible part having a surface on which matter is to be written, means operable over said surface and connected to the means having the exposure opening, and a shutter for the exposure opening movable with said depressible part, the shutter and said part being formed of a strip of stiff and elastic material fastened at one edge and yieldable at its opposite free edge.

11. In combination with means for supporting a sheet of sentitized material, a surface on which matter may be written, and a pantograph having a portion operable over said surface and provided with an exposure opening traveling over said sensitized material to reproduce on the latter the movement of the pantograph over said surface.

12. In combination with a camera having its casing provided with an opening under which a sheet of sensitized material is adapted to be arranged, a surface on which matter may be written, a pantograph having a portion operable over said surface and provided with an exposure opening traveling over said sensitized material in proximity to the casing opening, and a light excluding element carried by the pantograph to cover those portions of the casing opening about the exposure opening.

13. In combination with a camera having its casing provided with an opening under which a sheet of sensitized material is adapted to be arranged, a part having a surface on which matter may be written, a pantograph having a portion operable over said surface and provided with an exposure opening traveling over said sensitized material in proximity to the casing opening, and a light excluding member movable with the pantograph for covering those portions of said casing opening about said exposure opening.

14. In combination with a camera, a marking means for sensitized material in the camera comprising a surface on the camera on which matter is to be written, and means for making on the sensitized material, in a size different from that written on the surface, a reproduction of the matter written on the surface.

15. In combination with a camera, a marking means for sensitized material in the camera comprising a surface on the camera on which matter is to be written, and means for exposing on the sensitized material in a size different from that written on the surface, a reproduction of matter written on the surface.

16. In combination with a camera, a marking means for sensitized material in the camera comprising a manually operable member having an opening for throwing a small beam of rays on the sensitized material, said member having a universal movement in a single plane in order that any design may be exposed on the sensitized material through said opening.

17. In combination with a camera, a marking means for sensitized material in the camera comprising a surface on which matter is to be written, and a pantograph movable over said surface and carrying means for reproducing on the sensitized material the matter written on the surface.

18. In combination with a camera, a marking means for sensitized material in the camera comprising a surface on which matter is to be written, and means for making on the sensitized material a reproduction of the matter written on said surface in a size different from that written on surface.

19. In combination with a camera, a marking means for sensitized material in the camera comprising a surface on which matter is to be written, and means for making on the sensitized material a reproduction of the matter being written on the surface, in a size different from the matter on the surface and simultaneously with the writing on such surface.

20. In combination with a camera having its casing provided with an opening under which the sensitized material is adapted to be arranged, a surface on the casing on which matter may be written, a pantograph having an opening operable over such surface for the insertion of a pencil or the like, said pantograph having an exposure opening arranged to operate in proximity to said casing opening to travel in correspondence with the travel of the pencil opening, and a light excluding element movable with the pantograph to close all portions of the casing opening about the exposure opening.

21. In combination with a camera having its casing provided with an opening under which the sensitized material is adapted to be arranged, a surface on the casing on which matter may be written, said surface being movable under pressure of the writing device, a pantograph operable over said surface and having an opening arranged to operate in proximity to said casing opening to travel in correspondence with the matter written on the surface, a light excluding device movable with the pantograph to close all portions of the casing opening about the exposure opening, and a shutter for the exposure opening, opened by pressure on the surface.

22. A camera including a photographic plate or film element in combination with means including lazy tongs for identically reproducing script or other writings upon said plate or film element.

23. An autographic apparatus for cameras, comprising a device for delivering a circumscribed area of light to the sensitized surface within the camera, an operating device located outside the camera, and a pantographic system of levers connecting said two devices.

24. An autographic apparatus for cameras comprising a device for delivering a circumscribed area of light to the sensitized surface within the camera, an operating device located outside of the camera and connected to the first named device to cause the latter to make movements corresponding to the movements of the operating device and means controlled by the operating device for cutting off the light to the sensitized surface.

25. An autographic apparatus for cameras comprising a device for delivering a circumscribed area of light to the sensitized surface within the camera, an operating device located outside of the camera and connected to the first named device to cause the latter to make movements corresponding to the movements of the operating device, and a shutter for controlling the passage of light to the sensitized material by way of the operating device, said shutter being normally closed and being opened when pressure is applied to the first named device.

26. An autographic apparatus for cameras comprising a device for delivering a circumscribed area of light to the sensitized surface within the camera, an operating device located outside of the camera and connected to the first-named device to cause the latter to follow the movements of the operating device, and automatic means to cut off the supply of light to the sensitized surface when the apparatus is not in use.

27. An autographic recorder for cameras having a sensitized film therein comprising means for covering a portion of the film to form an inscription-panel thereon, operating means located outside the camera, and means within the camera for reproducing the movements of said operating means upon said panel.

28. In a camera, the combination of a guide frame for a sensitized film having an inwardly-extending shield for the film, and an autographic recorder comprising a movable element outside the camera, and means within the camera for reproducing the movements of said element upon the film.

29. In an autographic camera, the combination of a guide frame for the sensitized film having a shield to cover a portion of the film, means provided with an exposure opening, the camera case having an opening through which light rays enter said exposure-opening, a shutter controlling said case-opening, and operating means outside the camera connected to the means provided with said exposure-opening, said shield being arranged opposite said case-opening.

30. The combination of a camera-casing inclosing a sensitized film, a backing for the film having apertures, means for exposing the film through said apertures to a light-point, and means for controlling the movements of the light point from the outside of the casing.

31. An autographic camera having means for supporting a sensitized film therein, a movable element outside the camera, and means within the camera for reproducing the movements of said external element upon the film, said internal means being located on the rear side of the film.

WATSON A. BROWN.

Witnesses:
LUCY M. WANAMAKER,
H. H. SIMMS.

---

Corrections in Letters Patent No. 1,315,655.

It is hereby certified that in Letters Patent No. 1,315,655, granted September 9, 1919, upon the application of Watson A. Brown, of Rochester, New York, for an improvement in "Marking Means for Sensitized Material," errors appear in the printed specification requiring correction as follows: Page 3, line 15, claim 2, after the word "with," insert the words *means for supporting;* same page and claim, line 17, strike out the words "means for supporting"; page 4, lines 113–114, claim 25, for the word "operating" read *first named;* same page and claim, line 116, strike out the words "first named"; and that the said Letters Patent should be read with these corrections therein that the same may conform to the record of the case in the Patent Office.

Signed and sealed this 25th day of November, A. D., 1919.

[SEAL.]

M. H. COULSTON,
*Acting Commissioner of Patents.*

Cl. 95—1.